(12) United States Patent
Hong

(10) Patent No.: US 11,267,504 B2
(45) Date of Patent: Mar. 8, 2022

(54) APPARATUS AND METHOD FOR CONTROLLING STEER-BY-WIRE SYSTEM

(71) Applicant: MANDO CORPORATION, Pyeongtaek-si (KR)

(72) Inventor: SeungGyu Hong, Seoul (KR)

(73) Assignee: MANDO CORPORATION, Pyeongtaek-si (KR)

(*) Notice: Subject to any disclaimer, the term of this patent is extended or adjusted under 35 U.S.C. 154(b) by 241 days.

(21) Appl. No.: 16/518,088

(22) Filed: Jul. 22, 2019

(65) Prior Publication Data

US 2020/0023892 A1 Jan. 23, 2020

(30) Foreign Application Priority Data

Jul. 20, 2018 (KR) ........................ 10-2018-0084704

(51) Int. Cl.
*B62D 5/04* (2006.01)
*B62D 5/00* (2006.01)
*B62D 6/00* (2006.01)

(52) U.S. Cl.
CPC ........... *B62D 5/0484* (2013.01); *B62D 5/005* (2013.01); *B62D 5/046* (2013.01); *B62D 6/008* (2013.01); *B62D 5/001* (2013.01)

(58) Field of Classification Search
CPC ......... B62D 5/005; B62D 5/006; B62D 6/008
See application file for complete search history.

(56) References Cited

U.S. PATENT DOCUMENTS

| | | | | |
|---|---|---|---|---|
| 6,227,328 | B1* | 5/2001 | Shimizu | B62D 5/065 180/421 |
| 6,366,842 | B1* | 4/2002 | Kaji | B62D 5/065 701/41 |
| 2005/0067214 | A1* | 3/2005 | Tanaka | B62D 5/0463 180/446 |
| 2005/0224276 | A1* | 10/2005 | Sugitani | B62D 6/008 180/402 |
| 2006/0027418 | A1* | 2/2006 | Miyajima | B62D 5/0463 180/446 |
| 2006/0200289 | A1* | 9/2006 | Chino | B62D 5/006 701/41 |
| 2009/0024281 | A1* | 1/2009 | Hwang | B62D 6/008 701/42 |
| 2009/0026003 | A1* | 1/2009 | Kato | B62D 5/008 180/446 |
| 2017/0101127 | A1* | 4/2017 | Varunjikar | B62D 6/008 |
| 2017/0120949 | A1* | 5/2017 | Sakamaki | B62D 5/005 |
| 2018/0015945 | A1* | 1/2018 | Kim | B62D 6/003 |
| 2019/0039639 | A1* | 2/2019 | Park | B62D 6/00 |
| 2019/0084611 | A1* | 3/2019 | Klein | B62D 5/0481 |
| 2019/0092377 | A1* | 3/2019 | Shin | B62D 5/006 |
| 2019/0176878 | A1* | 6/2019 | Lee | H02P 29/40 |

(Continued)

*Primary Examiner* — Thomas G Black
*Assistant Examiner* — Sara J Lewandroski
(74) *Attorney, Agent, or Firm* — Hauptman Ham, LLP

(57) ABSTRACT

The present disclosure relates to an apparatus and a method for controlling a steer-by-wire system. In more details, the present disclosure relates to an apparatus and method for determining whether a catch-up is occurred due to a counter electromotive force in a rack drive motor in a steer-by-wire system and reflecting torque information that has not been output due to the catch-up on a steering reaction force motor, and thus providing an accurate steering sense for a driver.

13 Claims, 7 Drawing Sheets

(56) References Cited

U.S. PATENT DOCUMENTS

| | | | |
|---|---|---|---|
| 2019/0233000 A1* | 8/2019 | Matsuda | B62D 5/0463 |
| 2019/0256133 A1* | 8/2019 | Tsubaki | B62D 6/008 |
| 2019/0291777 A1* | 9/2019 | Ishio | B62D 6/00 |
| 2019/0359252 A1* | 11/2019 | Yu | G06F 17/142 |
| 2019/0367084 A1* | 12/2019 | Hong | B62D 5/0469 |
| 2020/0298909 A1* | 9/2020 | Kogure | B62D 5/046 |
| 2020/0361531 A1* | 11/2020 | Strecker | B62D 6/008 |

* cited by examiner

FIG.5

| RACK POSITION ERROR(mm) | CATCH-UP TORQUE(Nm) |
|---|---|
| 0.1 | 1 |
| 0.2 | 2 |
| ⋮ | ⋮ |
| 0.5 | 5 |
| ⋮ | ⋮ |
| 1 | 10 |

APPARATUS AND METHOD FOR CONTROLLING STEER-BY-WIRE SYSTEM

CROSS-REFERENCE TO RELATED APPLICATION

This application claims priority from Korean Patent Application No. 10-2018-0084704, filed on Jul. 20, 2018, which is hereby incorporated by reference for all purposes as if fully set forth herein.

BACKGROUND OF THE INVENTION

Field of the Invention

The present disclosure relates to an apparatus and a method for controlling a steer-by-wire system. In more details, the present disclosure relates to a specific apparatus and a specific method for determining occurrence/no-occurrence of a catch-up due to a counter electromotive force in a rack drive motor in a steer-by-wire system and reflecting torque information that has not been output due to the catch-up on a steering reaction force motor, and thus providing an accurate steering sense for a driver.

Description of Related Art

A steer-by-wire system of a vehicle is a motor-driven type steering apparatus in which a steering column module connected to a steering wheel and a steering rack module connected to vehicle wheels are mechanically separated.

Accordingly, a controller for the steering column module of a steer-by-wire system performs the process of estimating and sensing rack axial force information for reflecting information of the steering rack module, delivering a value thereof to the steering column module connected to a steering wheel of a driver, and giving a feedback to the driver using the rack axial force information.

However, this includes only information of an external load applied to the steering rack module and instrumental friction, and there is a problem in that a status for the capacity limit of a rack driver motor driving the steering rack module is not represented.

Accordingly, in a case in which a catch-up in which an output corresponding to a directed torque is not output due to generation of a counter electromotive force if the revolution speed of a motor is high occurs in the rack drive motor, even if an actual rack position does not follow a directed rack position, the steering rack module and the column module are physically separated from each other, and accordingly, there is a problem in that it is difficult for a driver to recognize such a situation.

SUMMARY OF THE INVENTION

One embodiment proposed in the background described above is to provide an apparatus and a method for controlling a steer-by-wire system that determines occurrence/no-occurrence of a catch-up and determines a catch-up torque lost due to the catch-up based on angular velocity information of the rack drive motor and information of a difference between the rack position and the directed rack position.

In addition, one embodiment is to provide an apparatus and a method for controlling a steer-by-wire system that enables a driver to predict a vehicle behavior at the time of performing steering, provides an accurate steering sense, and can cause a rack position to coincide with a steering angle of the driver by reflecting the catch-up torque information on the steering reaction force motor.

There is provided a control apparatus for a steer-by-wire system including: a receiver that receives rack driving motor angular velocity information, rack position information, and rack axial force information from a sensor configured inside a vehicle; a catch-up occurrence determiner that determines occurrence/no-occurrence of a catch-up in which an output of a rack driving motor is less than a directed value due to a counter electromotive force based on at least one of the rack driving motor angular velocity information, the rack position information, or directed rack position information used for adjusting vehicle wheels in accordance with driver steering; a catch-up torque determiner that determines a catch-up torque that has not been output due to a counter electromotive force in the rack driving motor based on the rack position information and the directed rack position information if it is determined that a catch-up has occurred in the rack driving motor; and a controller that controls a steering reaction force motor based on the catch-up torque information.

In addition, one embodiment provides a method for controlling a steer-by-wire system including: receiving rack driving motor angular velocity information, rack position information, and rack axial force information from a sensor configured inside a vehicle; determining occurrence/no-occurrence of a catch-up in which an output of a rack driving motor is less than a directed value due to a counter electromotive force based on at least one of the rack driving motor angular velocity information, the rack position information, or directed rack position information used for adjusting vehicle wheels in accordance with driver steering; determining a catch-up torque that has not been output due to a counter electromotive force in the rack driving motor based on the rack position information and the directed rack position information if it is determined that a catch-up has occurred in the rack driving motor; and controlling a steering reaction force motor based on the catch-up torque information.

Furthermore, another embodiment provides a steer-by-wire system including: a steering rack that detects rack driving motor angular velocity information and rack position information of a vehicle; a controller that determines occurrence/no-occurrence of a catch-up in which an output of a rack driving motor is less than a directed value due to a counter electromotive force based on at least one of the rack driving motor angular velocity information or the rack position information detected by the steering rack or directed rack position information used for adjusting vehicle wheels in accordance with driver steering and determines a catch-up torque that has not been output due to a counter electromotive force in the rack driving motor based on the rack position information and the directed rack position information if it is determined that a catch-up has occurred in the rack driving motor; and a steering column that drives a steering reaction force motor based on the catch-up torque information determined by the controller.

The one embodiment described above provides effects of enabling a driver to predict an amount of revolution of wheels at the time of performing steering by recognizing catch-up information of the rack drive motor in the steer-by-wire system and causing a steering angle to coincide with a rack position according thereto by improving a degree of difficulty in steering by reflecting the catch-up torque on the steering reaction force motor in a case in which the driver performs steering at a specific angular velocity or more.

BRIEF DESCRIPTION OF THE DRAWINGS

FIG. 5 is a diagram illustrating an example of catch-up torque table information of a catch-up torque determiner according to one embodiment.

DETAILED DESCRIPTION OF THE INVENTION

Figure 1:
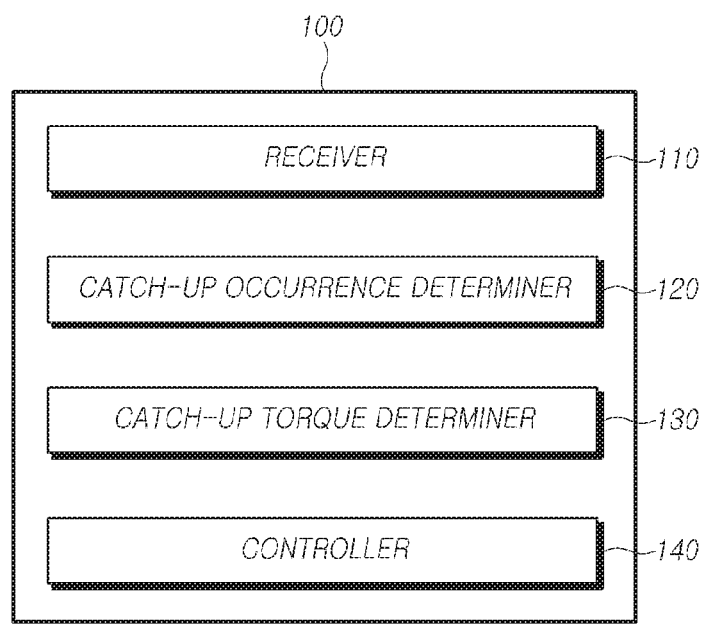
FIG. 1 is a diagram illustrating the configuration of a control apparatus for a steer-by-wire system according to one embodiment.

The present technical idea discloses an apparatus and a method for controlling a steer-by-wire system.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B" "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

A vehicle described here may have a concept including a car, a motorcycle, and the like. In addition, a vehicle may have a concept including an internal combustion engine vehicle that includes an engine as its power source, a hybrid vehicle that includes an engine and an electric motor as its power source, an electric vehicle that includes an electric motor as its power source, and the like.

Hereinafter, a vehicle will be described mainly as a car. An apparatus and a method for controlling a steer-by-wire system described here can control a steering column module and a steering rack module. The steer-by-wire system can perform a function of rotating vehicle wheels with driver's steering information of a driver reflected and providing a steering reaction sense for a driver in accordance with resistance of vehicle wheels and external environments. In this case, a motor that moves a rack in the steering rack module for rotating the vehicle wheels in accordance with driver steering information will be referred to as a rack driving motor in description. A rack position represents a position of a rack inside a vehicle, and a rack axial force represents a force that is applied or to be applied for moving the rack in accordance with a road surface environment, an external load, driver steering, and the like. However, the rack driving motor, the rack position, and the rack axial force are expressions used for describing operations inside a vehicle, and names are not limited thereto. For example, the rack axial force may be also referred as a rack force, the rack driving motor may be also referred to as a rack motor, and the rack position may be also referred to as a rack location or the like.

Hereinafter, an apparatus and a method for controlling a steer-by-wire system according to the present disclosure will be described with reference to the drawings.

FIG. 1 is a diagram illustrating the configuration of a control apparatus for a steer-by-wire system according to one embodiment.

Referring to FIG. 1, the control apparatus 100 for a steer-by-wire system may include a receiver 110 that receives at least one of rack driving motor angular velocity information, rack position information, or rack axial three information from a sensor configured inside a vehicle, a catch-up occurrence determiner 120 that determines occurrence/no-occurrence of a catch-up in which an output of the rack driving motor is less than a directed value due to a counter electromotive force based on at least one of the rack driving motor angular velocity information, the rack position information, or directed rack position information used for adjusting vehicle wheels in accordance with driver steering, a catch-up torque determiner (130) that determines a catch-up torque that has not been output due to a counter electromotive force in the rack driving motor based on the rack position information and the directed rack position information if it is determined that a catch-up has occurred in the rack driving motor, and a controller 140 that controls a steering reaction force motor based on the catch-up torque information.

The receiver 110 of the control apparatus 100 for the steer-by-wire system according to one embodiment may receive at least one of angular velocity information of the rack driving motor, rack position information, or rack axial force information from a sensor configured inside the vehicle. In such a case, an angular velocity sensor of the rack driving motor may be an encoder mounted to the motor. The encoder may detect the number of revolutions, a rotation direction, and the like of the rack driving motor. A sensor used for receiving rack position information may be a sensor that is directly or indirectly attached to the rack. In addition, the rack axial force information may be information received from a sensor mounted inside or outside the vehicle. Alternatively, the rack axial force information may be information that is estimated by performing an additional process of determining the rack axial force information.

For example, in order to estimate rack axial force information, the receiver 110 may receive and transmit information such as steering angle information, a torque of the rack driving motor, and a yaw rate and then receive rack axial force information from an additional system inside the vehicle estimating the rack axial force information. In addition, according to one embodiment, there may be a plurality of sensors, which are configured inside or outside the vehicle, generating information to be received by the receiver 110. The sensor described above may be a spare sensor for preparing a sensor error or malfunction inside the vehicle. In addition, information received by the receiver 110 according to one embodiment is not limited to the angular velocity information of the rack driving motor, the rack position information, and the rack axial force information and may include steering angle information, drive steering torque information, and the like if it is necessary for an operation of the control apparatus 100 for the steer-by-wire system.

The catch-up occurrence generator 120 according to one embodiment may determine occurrence/no-occurrence of a catch-up in which an output of the rack driving motor is less than a directed value due to a counter electromotive force based on at least one of rack driving motor angular velocity information, rack position information or directed rack position information used for adjusting vehicle wheels in accordance with driver steering. Here, the directed rack position information may include direction information used for moving the position of the rack based on information detected at a steering wheel of a steering column as information used for adjusting vehicle wheels in accordance with driver's steering. In other words, the catch-up occurrence determiner 120 may determine whether or not a catch-up situation, in which an output corresponding to a directed torque is not acquired due to generation of a counter electromotive force if the rotation speed of the motor is high, has occurred in the rack driving motor.

For this, the catch-up occurrence determiner 120 according to one embodiment may determine occurrence/no-occurrence of a catch-up by comparing rack position information with directed rack position information in a case in which the rack driving motor angular velocity information is equal to or higher than first angular velocity information. In other words, the catch-up occurrence determiner 120 may determine that a counter electromotive force can be generated in the rack driving motor in a case in which the angular velocity is equal to or higher than a first angular velocity, and specific determination of a catch-up situation due to a counter electromotive force may be performed through a comparison between rack position information and directed rack position information.

At this time, the first angular velocity information according to one embodiment may be a threshold representing a condition under which a catch-up can occur. In addition, the first angular velocity information may be set in accordance with a user in advance. Alternatively, the first angular velocity may be a value set in accordance with unique characteristics of the rack driving motor. Alternatively, the first angular velocity may be determined based on a motor characteristic curve representing a relation between the speed and the torque among unique characteristics of the rack driving motor. In such a case, the first angular velocity may be determined using rack axial force information that is estimated or received. For example, the first angular velocity may be determined in accordance with a motor characteristic curve, which is set in advance, of the rack driving motor and rack axial force information. In other words, there are unique characteristics for each motor, and accordingly, speed information to be output from the motor for outputting a rack axial force may be derived in accordance with motor characteristic curve information representing a relation between the speed (rpm) and the torque (Nm) and torque information of rack axial force information. In this process, first angular velocity information that can be maximally output by the motor may be derived, and a detailed method thereof will be described more specifically in FIG. 4 to be described later.

The catch-up occurrence determiner 120 according to one embodiment may determine rack position error information acquired by determining a difference between rack position information and directed rack position information and determine that a catch-up has occurred in the rack driving motor in a case in which the rack position error information is equal to or larger than a second value set in advance. In other words, if a catch-up has occurred, there may be a difference between a directed rack position and a rack position, and, for this, it may be determined whether or not a catch-up has occurred by determining a difference information between the rack position and the directed rack position. The reason for this is that the output of the rack driving motor decreases in a case in which a catch-up has occurred. At this time, a method for determining an occurrence of a catch-up using the catch-up occurrence determiner 120 and the second vale set in dance will be described in more detail with reference to FIG. 3 to be described later.

Meanwhile, if it is determined that a catch-up has occurred in the rack driving motor, the catch-up torque determiner 130 according to one embodiment may determine a catch-up torque that has not been output due to a counter electromotive force in the rack driving motor based on the rack position information and the directed rack position information. If a catch-up occurs, a situation in which a torque corresponding to the directed rack position information cannot be output to the rack driving motor occurs, and it is necessary to determine a torque that has not been output by the motor and reflect the determined torque on the steering reaction force motor. For this, the catch-up torque determiner 130 may determine a catch-up torque corresponding to a deficient output.

For this, the catch-up torque determiner 130 according to one embodiment may determine rack position error information acquired by determining a difference between the rack position information and the directed rack position information and determine a catch-up torque based on the rack position error information. In other words, in a case in which an actual rack position is less than a directed rack position, it means that the output of the rack driving motor is insufficient as that much, and accordingly, the error information can be an index representing a motor torque that has not been output due to a catch-up. Accordingly, the catch-up torque determiner 130 according to one embodiment may determine a catch-up torque based on the rack position error information.

For example, the catch-up torque determiner 130 according to one embodiment may check a catch-up torque corresponding to the rack position error information and determine the catch-up torque based on catch-up torque table information that is mapped for each piece of rack position error information and is set in advance. In other words, the catch-up torque determiner 130 may seta catch-up torque corresponding to the error information in advance using the rack position error information as a variable. Alternatively, the catch-up torque determiner 130 may determine a catch-up torque using a relation equation, which has the rack position error information as its variable, set in advance. Alternatively, the catch-up torque determiner 130 may determine a catch-up torque using the rack position error information and information such as a rack axial force and an external load representing a vehicle state. A specific description thereof will be presented in more details with reference to FIG. 5 to be described later.

The controller 140 according to one embodiment may control the steering reaction force motor based on the catch-up torque information determined by the catch-up torque determiner 130. This may mean that an output of the rack driving motor corresponding to the catch-up torque is not acquired, and, as a result, the rotation of the vehicle wheels corresponding to driver's steering is not performed, and accordingly, the controller 140 according to one embodiment may reflect rotation information of the vehicle wheels on the driver.

In such a case, the controller 140 according to one embodiment may convert the catch-up torque information into an additional current to be applied to the steering reaction force motor and supply the additional current to the steering reaction force motor. Since the catch-up torque determiner 130 according to one embodiment determines a torque of the rack driving motor that has not been output using a unit of the amount of torque, it is necessary for the controller 140 to convert the catch-up torque into an amount of current based on unique characteristics of the steering reaction force motor that can provide a reaction sense for a driver and unique characteristics of the vehicle and supply the resultant current. At this time, the controller 140 may convert the catch-up torque into a current using a conversion value that is a predetermined constant and reflect the catch-up torque information on the steering reaction force motor. In such a case, the predetermined constant may be a value that is set in advance using unique information of the vehicle. Alternatively, the predetermined constant may be a value set by a user in advance. Alternatively, the controller 140 may convert the catch-up torque into a current using a conversion value that can be changed in accordance with a vehicle state and reflect the catch-up torque information on the steering reaction force motor. In such a case, the conversion value that can be change may be determined in accordance with a vehicle state and running information. For example, motor torque information representing a driving status of the steering reaction force motor or the amount of current applied to the steering reaction force motor in accordance with motor RPM information may be changed. Alternatively, the amount of current applied to the steering reaction force motor may be changed also in accordance with driver's steering angle information. In addition, in such a case, a control operation of the controller 140 may be performed in parallel with an existing control logic used for controlling the steering reaction force motor.

The embodiment described above is merely one embodiment for the controller 140 to reflect catch-up torque information on the steering reaction force motor, and the method of reflecting catch-up torque information on the steering reaction force motor that is used by the controller 140 is not limited or restricted to that of the embodiment described above. In addition, in order to reflect the catch-up torque information on the steering reaction force motor, the controller 140 may perform various motor control methods functioning the same as the method described above.

Through this, the controller 140 can accurately provide catch-up torque information that is not output due to a catch-up in the rack driving motor for the driver by substantially supplying a current to the steering reaction force motor.

For the objective described above, the receiver 110, the catch-up occurrence determiner 120, the catch-up torque determiner 130, and the controller 140 of the control apparatus 100 for the steer-by-wire system may be realized using one or more processors operated in accordance with a set program, and the set program may include a series of instructions used for performing each step included in the method for controlling a steer-by-wire system according to one embodiment of a present technological idea to be described later.

As above, while the components of the control apparatus 100 for the steer-by-wire system and an operation of each component have been briefly described, hereinafter, more specifically, the operation of each component of the control apparatus 100 for the steer-by-wire system will be described in detail with reference to FIGS. 2 to 5.

Figure 2:
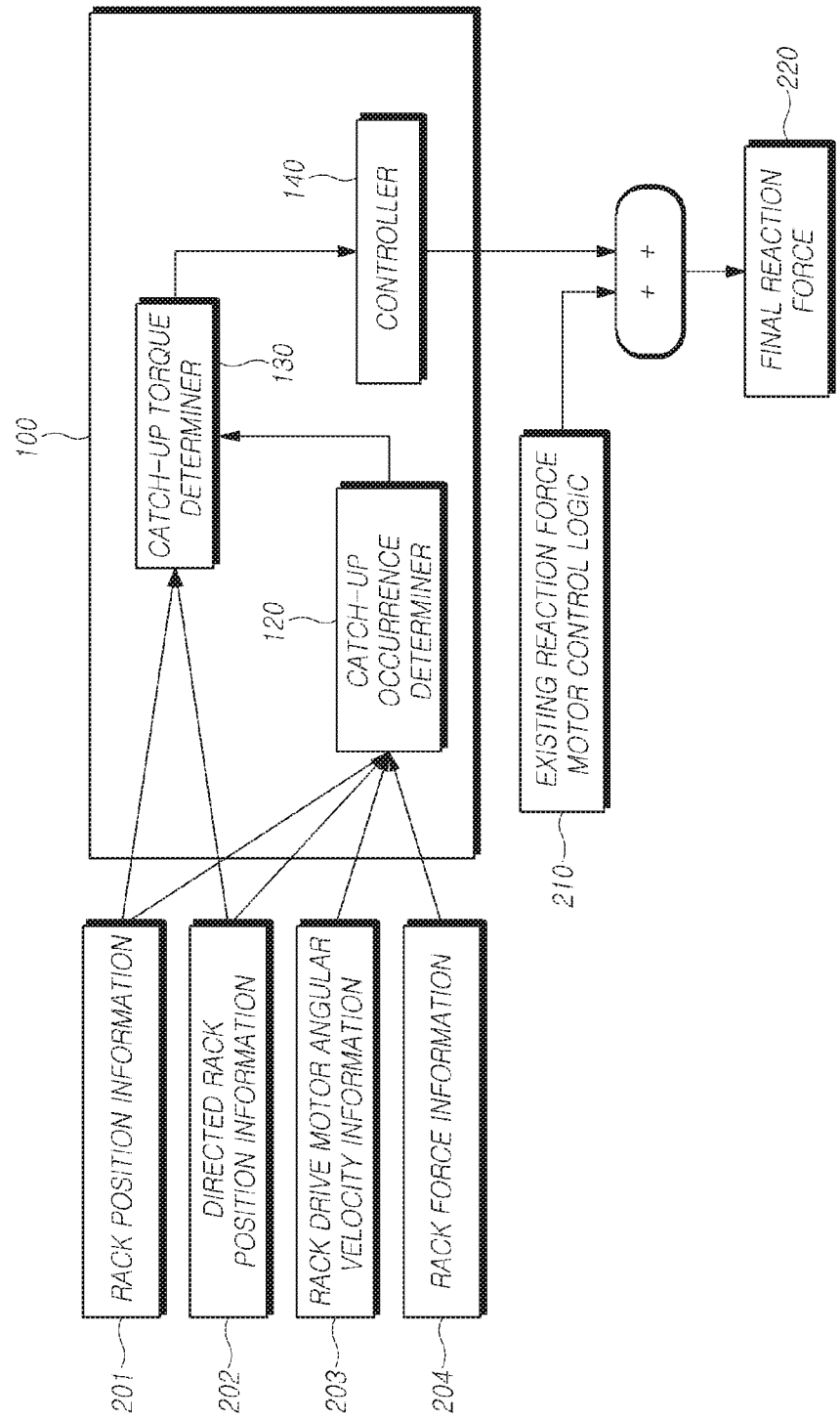
FIG. 2 is a diagram illustrating an operation in which a control apparatus for a steer-by-wire system according to one embodiment is applied inside a vehicle.

FIG. 2 is a diagram illustrating an operation in which a control apparatus for a steer-by-wire system according to one embodiment is applied inside a vehicle.

Referring to FIG. 2, after receiving sensing information, the control apparatus 100 for the steering-by-wire system may be applied in parallel with an existing logic controlling a steering reaction force motor.

More specifically, the control apparatus 100 for a steer-by-wire system according to one embodiment performs operations based on rack position information 201, directed rack position information 202, rack driving motor angular velocity information 203, and rack axial force information 204. At this time, although not illustrated in FIG. 2, the control apparatus 100 for a steer-by-wire system according to one embodiment may receive the rack position information 201, the directed rack position information 202, the rack driving motor angular velocity information 203, and the rack axial force information 204 through the receiver 110. In addition, the rack position information 201, the rack driving motor angular velocity information 203, and the rack axial force information 204 may be information received by the receiver 110 or information estimated from sensors.

In addition, the catch-up occurrence determiner 120 according to one embodiment may determine occurrence/no-occurrence of a catch-up based on the information described above. In other words, the catch-up occurrence determiner 120 may determine whether or not a catch-up has occurred in the rack driving motor based on the operation described above and deliver information relating to a result of the determination to the catch-up torque determiner 130. Accordingly, if a catch-up has not occurred in the rack driving motor, the catch-up occurrence determiner 120 according to one embodiment may deliver a result indicating no occurrence of a catch-up to the catch-up torque determiner 130, and, as a result, the catch-up torque determiner 130 and the controller 140 according to one embodiment may perform no operation.

However, in a case in which a catch-up has occurred in the rack driving motor, the catch-up torque determiner 130 may determine a catch-up torque in accordance with a result of the determination acquired by the catch-up occurrence determiner 120 according to one embodiment. For this, the catch-up torque determiner 130 may use the rack position information and the directed rack position information. In other words, as described above, the catch-up torque determiner 130 may determine a difference between the rack position information and the directed rack position information and determine a catch-up torque based on the difference.

Meanwhile, after the catch-up torque is determined by the catch-up torque determiner 130, the controller 140 according to one embodiment may receive the catch-up torque information from the catch-up torque determined 130 and reflect the catch-up torque information on the steering reaction force motor. In such a case, the catch-up torque information to be reflected by the controller 140 may be added with reaction force information to be reflected in accordance with another factor of the inside or the outside of the vehicle. In other words, existing reaction force motor control logic 210 may have a configuration for controlling steering information to be applied to the steering reaction force motor. The existing reaction force motor control logic 210 may be an apparatus and a method for providing all of vehicle information, steering reaction force motor information, friction information for a road surface or external force information applied to wheels, and the like for the steering reaction force motor. However, since there is a problem in that a configuration for determining occurrence/no-occurrence of a catch-up of the rack driving motor is not present in the existing reaction force motor control logic 210, the process of reflecting a final reaction force 220 to be reflected on the steering reaction force motor may be performed by being added with the catch-up torque information determined by the steer-by-wire control apparatus 100 according to one embodiment. Accordingly, the control of the controller 140 may be determined by being added with the existing reaction force motor control logic 210 and be reflected in the form of a final reaction force 220 for a driver.

According to the embodiment described above, the control apparatus 100 of the steer-by-wire system may determine occurrence/no-occurrence of a catch-up in the rack driving motor in accordance with operations of the receiver 110, the catch-up occurrence determiner 120, the catch-up torque determiner 130, and the controller 140 described above and deliver an accurate steering sense for a driver by determining a catch-up torque according to the occurrence of the catch-up. In this process, not only by reflecting the catch-up torque information on a driver but also by additionally using an existing method of providing reaction force information for a reaction force motor, whereby an effect of providing a more accurate steering sense is provided.

The embodiment described above is merely one example of the control apparatus 100 of the steer-by-wire system, and a configuration in which the control apparatus 100 of the steer-by-wire system is operated inside the vehicle is not limited or restricted to the embodiment described above. In addition, the application of the control apparatus 100 of the steer-by-wire system to a system inside a vehicle may be realized by various steer-by-wire systems having the same function as that of the operation described above.

Figure 3:
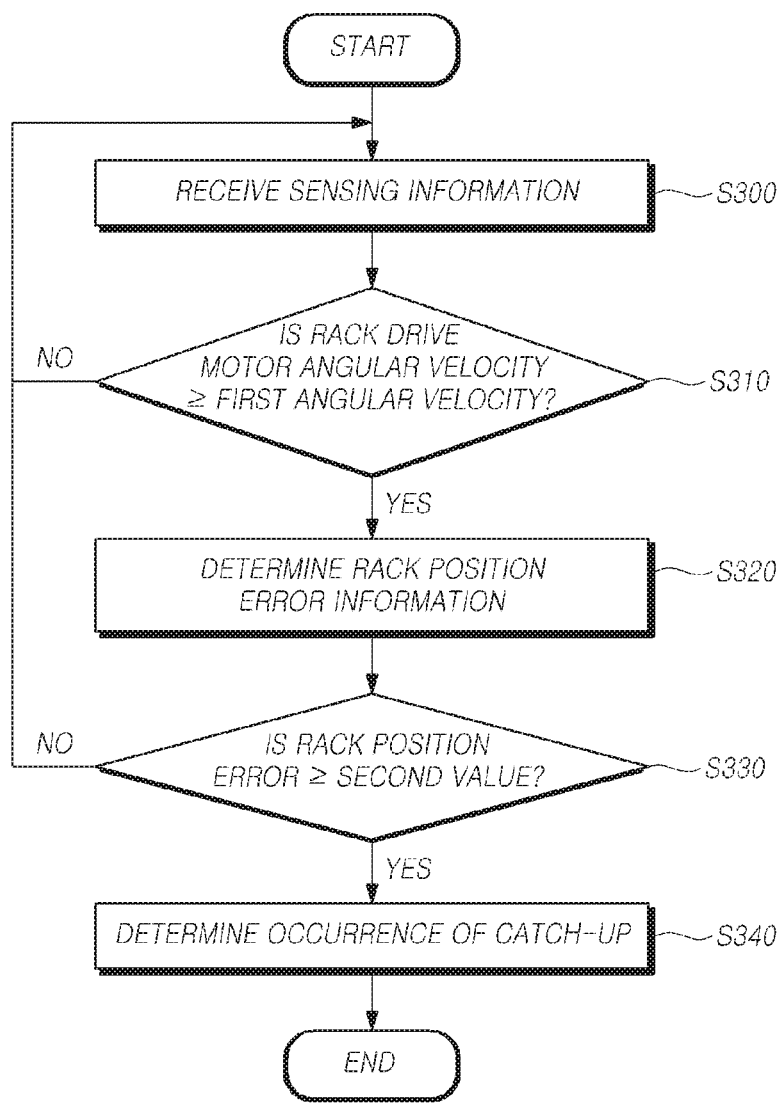
FIG. 3 is a diagram illustrating an operation of a catch-up occurrence determiner according to one embodiment.

FIG. 3 is a diagram illustrating an operation of a catch-up occurrence determiner according to one embodiment.

Referring to FIG. 3, after comparing a rack driving motor angular velocity with a first angular velocity in accordance with the first angular velocity, the catch-up occurrence determiner 120 according to one embodiment may determine occurrence/no-occurrence of a catch-up based on rack position error information.

More specifically, the catch-up occurrence determiner 120 according to one embodiment may receive at least one of the rack driving motor angular velocity information, the rack position information, or the rack axial force information from the receiver 110 (S300). At this time, the rack axial force information may be information received from the receiver 110. Alternatively, the rack axial force information may be information estimated through steering angle information and information such as a rack driving motor torque and a yaw rate.

Thereafter, the catch-up occurrence determiner 120 may determine catch-up/no-catch up by comparing first angular velocity information determined in advance with the rack driving motor angular velocity information. In other words, if the rack driving motor angular velocity is equal to or higher than the first angular velocity, the catch-up occurrence determiner 120 may determines that a condition of an occurrence of a catch-up is satisfied (S310).

At this time, the first angular velocity is a threshold for which a counter electromotive force can be generated in the rack driving motor and may be set in advance in accordance with a user. Alternatively, the first angular velocity may be a value that is set in accordance with unique characteristics of the rack driving motor. Alternatively, the first angular velocity may be a threshold angular velocity, at which a counter electromotive force of the rack driving motor can be generated, set as an experimental value. Alternatively, the first angular velocity may be determined based on a motor characteristic curve representing a relation between the speed and the torque among unique characteristics of the rack driving motor. In such a case, the first angular velocity may be determined using rack axial force information that has been estimated or received. In other words, the first angular velocity may be determined in accordance with the motor characteristic curve, which has been set in advance, of the rack driving motor and the rack axial force information. A method for determining the first angular velocity using the motor characteristic curve and the rack axial force information is illustrated in detail in FIG. 4.

Figure 4:
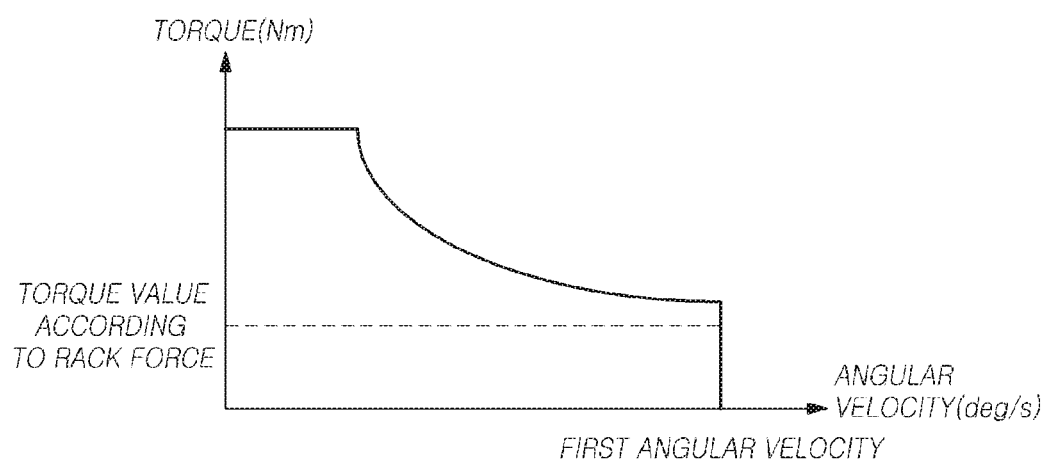
FIG. 4 is a diagram illustrating a method for determining a first angular velocity based on a motor characteristic curve, which has been set in advance, according to one embodiment.

FIG. 4 is a diagram illustrating a method for determining a first angular velocity based on a motor characteristic curve, which has been set in advance, according to one embodiment.

Referring to FIG. 4, in a motor characteristic curve, a first angular velocity that is a threshold for determining a counter electromotive force generation condition can be determined in accordance with rack axial force information. In other words, since a unique maximum output is determined in a motor, there may be a unique characteristic curve representing a relation between the torque and the angular velocity of the motor. In such a case, by assuming that the maximum output of the motor is determined to be a constant value except for error, the angular velocity and the torque may have an inverse proportional relation as in a graph illustrated in FIG. 4. At this time, the angular velocity of the motor may decrease as an external load (torque) increases. At this time, a case in which the load increases means that a current flowing into the motor increases. However, in this case, since there is a limit in the range in which the current can increase, the motor may not output a torque that is equal to or higher than a predetermined level. Accordingly, in the graph illustrated in FIG. 4, there may be a torque limit value regardless of an angular velocity value.

Contrary to this, the angular velocity that can be output by the motor may increase as the load decreases. However, in such a case, if the rotation speed of the motor is high, an external force directed opposite to a driving direction in which the motor needs to output an angular velocity may be generated in accordance with an influence of a magnetic field. Accordingly, there may be a predetermined limit on the angular velocity output by the motor. In other words, as the angular velocity of the motor increases, a counter electromotive force may be generated in the motor, and there may be a limit on the output of an angular velocity that is equal to or higher than a predetermined level.

Accordingly, as presented in FIG. 5, a limit speed of a motor that is determined in the rack driving motor based on the rack axial force information may be determined. In other words, a torque value to be determined in the rack driving motor may be determined in accordance with the rack axial force information, and a limit speed of the motor that corresponds to the torque value may be derived within the motor characteristic curve. In such a case, the unit of the limit speed of the motor may be RPM and may be converted into the unit of angular velocities.

In accordance with the embodiment described above, a first angular velocity that is an angular velocity at which a counter electromotive force can be generated in the rack driving motor may be set in advance using the rack axial force information and the motor characteristic curve.

The embodiment described above is merely one example of the method, which is set in advance, for determining a first angular velocity, and the method for determining a first angular velocity is not limited or restricted to that of the embodiment described above. In addition, a first angular velocity may be determined using a different operation or method as long as it can be a criterion for controlling generation/no-generation of a counter electromotive force.

On the other hand, if the rack driving motor angular city is lower than the first angular velocity as a result of the determination in Step S310 (No in Step S310), the angular velocity of the rack driving motor may mean that sufficient motor rotation at which a counter electromotive force can be generated is not performed. Accordingly, even in a case in which there may be a difference between an actual rack position and a directed rack position, there is no situation in which a counter electromotive force can be generated, and accordingly, the catch-up occurrence determiner 120 may determine that error in the rack position has not occurred in accordance with a catch-up. In such a case, the catch-up occurrence determiner 120 according to one embodiment may receive sensing information again for determining occurrence/no-occurrence of a catch-up in the rack driving motor.

However, if the rack driving motor angular velocity is equal to or higher than the first angular velocity as a result of the determination in Step S310 (Yes in Step S310), the catch-up occurrence determiner 120 according to one embodiment may determine rack position error information (S320). In other words, since motor rotation of which the angular velocity of the rack driving motor allows generation of a counter electromotive force is performed, generation/no-generation of a catch-up in the rack driving motor can be determined based on the rack position information and the directed rack position information.

In other words, in a case in which the rack driving motor angular velocity is equal to or higher than the first angular velocity, the catch-up occurrence determiner 120 according to one embodiment may determine generation/no-generation of a catch-up through a difference between the rack position information and the directed rack position information.

Thereafter, the catch-up occurrence determiner 120 according to one embodiment may compare rack position error with a second value set in advance (S330). This may mean that the actual rack has not moved in correspondence with a directed rack position, and, as a result, there is a difference between the actual rack position and the directed rack position. In other words, it may mean that the output of the rack driving motor corresponding to the directed output is not acquired, and, as a result, a catch-up due to a counter electromotive force has occurred in the rack driving motor at an angular velocity that is equal to or higher than a predetermined angular velocity.

At this time, the second value set in advance may be a value determined through user setting. In addition, the second value set in advance may be a value on which error between sensing information and actual information is reflected. In other words, the second value set in advance may be a value having a predetermined range in consideration of predetermined error.

In addition, the second value set in advance may be a value that can be changed in accordance with a vehicle state. For example, the second value may be changed in accordance with external load (external force) information. In such a case, a range in which the rack position can move may be decreased in a case in which the external force is strong than in a case in which the external force is weak, in other words, the usable range of the rack position may be relatively decreased in a case in which the external load is large in a status in which the output of the rack driving motor is constant. Accordingly, in such a case, the second value set in advance may have a smaller value in a case in which the external force is strong than in a case in which the external force is weak.

As another example, the second value may be changed in accordance with vehicle speed information. In such a case, as the vehicle speed becomes high, the steering angle is changed in a relatively small range, and accordingly, a change in the rack position may be relatively small as well. Accordingly, in such a case, the second value set in advance may have a smaller value in a case in which the vehicle speed is high than in a case in which the vehicle speed is low. In addition, even if the second value is not changed in accordance with vehicle speed information, the vehicle speed information may be considered in the process of determining an external load.

In addition, the second value set in advance may be a value set in advance in accordance with a vehicle unique state. For example, the size of the vehicle rack may be different in accordance with the size of a vehicle, and the second value set in advance may have a smaller value as the size of the rack is smaller. As another example, a difference between a directed rack position and an actual rack position may be smaller in a case in which the range of the output value of the rack driving motor is narrow than in a case in which the range of the output value of the rack driving motor is wide. In addition, even if the second value is not changed in accordance with vehicle speed information, the vehicle speed information may be considered in the process of determining an external load.

The second value may be determined according to the embodiments described above. However, the embodiments described above are merely examples for the second value, and a criterion used for determining the second value is not limited or restricted to the embodiments described above. In addition, the second value is not limited to one of the embodiments described above but may be variously determined through a combination of the embodiments as long as there is no contradiction. For example, the second value may be changed in accordance with a vehicle state and may be changed in accordance with a plurality of variables.

On the other hand, in a case in which rack position error is less than the second value set in advance as a result of the determination in Step S330 (No in Step S330), it may mean that a catch-up has not occurred in the rack driving motor due to no generation of a meaningful counter electromotive force. Accordingly, even if there may be a difference between an actual rack position and a directed rack position, the catch-up occurrence determiner 120 may determine that a meaningful catch-up that needs to be reflected for the driver has not occurred. In such a case, the catch-up occurrence determiner 120 according to an embodiment may receive sensing information for determining occurrence/no-occurrence of a catch-up in the rack driving motor.

However, in a case in which the rack position error is equal to or larger than the second value set in advance as a result of the determination in Step S330 (Yes in Step S330), the catch-up occurrence determiner 120 according to one embodiment may determine that a catch-up has occurred in the rack driving motor (S3410). In other words, the output of the rack driving motor corresponding to a directed value is not acquired, and a difference between a directed rack position and an actual rack position may occur, and accordingly, the catch-up occurrence determiner 120 according to one embodiment may determine that a catch-up causing the output of the rack driving motor to decrease has occurred.

In accordance with the embodiment described above, the catch-up occurrence determiner 120 may perceive occurrence/no-occurrence of a catch-up in the rack driving motor.

Through this, the catch-up occurrence determiner 120 provides an effect of being capable of quickly and accurately determining occurrence/no-occurrence of a catch-up in the rack driving motor through the rack driving motor angular velocity, the actual rack position, and the directed rack position information. In addition, an effect of preventing an unnecessary operation of the catch-up torque determiner 130 is provided by determining occurrence/no-occurrence of a catch-up first.

FIG. 5 is a diagram illustrating an example of catch-up torque table information of a catch-up torque determiner according to one embodiment.

The catch-up torque determiner 130 may determine rack position error information acquired by determining a difference between the rack position information and the directed rack position information and determine a catch-up torque based on the rack position error information. In other words, the catch-up torque determiner 130 may determine that the torque of the rack driving motor corresponding to the rack position error has not been output. In such a case, a difference between the directed rack position and the actual rack position may include torque information that has not been output due to a catch-up in the rack driving motor, and thus, the rack position error information may mean an index that represents a torque that has not been output by the rack driving motor. The catch-up torque determiner 130 according to one embodiment may determine a torque corresponding to the rack position error information and determines information of the catch-up torque. In addition, in order to reflect the information on the steering reaction force motor, the catch-up torque determiner 130 may deliver the corresponding information to the controller 140.

Referring to FIG. 5, for this, the catch-up torque determiner 130 according to one embodiment may determine a catch-up torque by checking the catch-up torque corresponding to the rack position error information based on the catch-up torque table information that is mapped for each piece of rack position error information and is set in advance. In other words, since the rack position error information reflects a torque that has not been output by the rack driving motor, the catch-up torque determiner 130 may determine a catch-up torque using the catch-up torque table information that is set in advance by mapping a catch-up torque in accordance with corresponding error information.

Accordingly, the catch-up torque table information of the catch-up torque determiner 130 may be a chart in which a catch-up torque to be determined is assigned in advance in accordance with rack position error information. In such a case, the catch-up torque table information may be a chart in a case in which there are a plurality of rack driving motors. Alternatively, the catch-up torque table information may not have the same value in accordance with characteristics of each rack driving motor and the size of the rack.

In addition, in the catch-up torque table information, not only a catch-up torque may be assigned in accordance with rack position error information but also the catch-up torque may be changeably reflected in accordance with a vehicle speed, a steering angle, a steering angular velocity, a driver steering torque, an external force, a road surface status, a rack, and unique environment information of the vehicle. For example, even if the same rack position error information is included, a catch-up torque may be different in accordance with a vehicle speed, the size of a rack, or an external force, and accordingly, in the catch-up torque table information, a catch-up torque may be assigned with information representing a vehicle state described above reflected.

In addition, in the catch-up torque table information, the value may be different in accordance with unique characteristics of the rack driving motor. In addition, in the catch-up torque table information, a catch-up torque according to rack position error information may be differently assigned for each motor with not only information representing the current state of the vehicle but also a unique hardware attribute of the rack driving motor reflected.

Accordingly, the catch-up torque determiner 130 according to one embodiment may check a catch-up torque using rack position error information as a variable in the catch-up torque table information. In other words, the catch-up torque determiner 130 may determine torque information that has not been output due to a catch-up in the current rack driving motor based on the rack position error information and deliver the determined torque information to the controller 140.

In other words, referring to FIG. 5, a specific embodiment in which the catch-up torque determiner 130 checks and determines catch-up torque information through catch-up torque table information is presented. In this case, a catch-up torque may be assumed using the rack position error information as an index. In such a case, in the catch-up torque table information, a catch-up torque may have a maximum value of 10 Nm while the rack position error has a range of a maximum value of 1 mm. As can be checked in the catch-up torque table information, it is represented that a torque that cannot be output by the rack driving motor becomes larger as the rack position error information increases, and accordingly, as a result, the catch-up torque may increase as the rack position error information becomes larger.

Meanwhile, the catch-up torque determiner 130 according to one embodiment may determine a catch-up torque using a relation equation set in advance. In other words, the catch-up torque determiner 130 may determine a catch-up torque using a relation equation, which is set in advance, having at least one of the rack position error information, the rack position information, or the directed rack position information. For example, the relation equation set in advance may be a linear equation that is in proportional to the rack position error information. Alternatively, the relation equation set in advance may be a relation equation, in which a function is set for each section, having the rack position error information as a variable. Alternatively, the relation equation set in advance may be a relation equation, in which a gain value used for actual driving is reflected based on an experimental value, acquired by adding a predetermined proportional coefficient to the relation equation described above. Alternatively, the relation equation set in advance may be a relation equation for determining a catch-up torque by reflecting current states of the vehicle such as a rack driving motor rpm, torque information, steering angle information, vehicle speed information, and driver steering torque information as additional variables. In other words, as described above, the second value set in advance is a value that can be changed in accordance with a vehicle speed and the size of a rack, and accordingly, a method for determining a catch-up torque may be also changed. For example, in an environment in which the second value used for identifying a catch-up situation is relatively large, it represents that a change range of the rack position error information can be relatively large, and accordingly, it may represent that the catch-up torque is higher in a case in which the second value is small than in a case in which the second value is large even if the same rack position error occurs.

In accordance with the embodiment described above, the catch-up torque determiner 130 may determine torque that has not been output by the rack driving motor as a catch-up torque.

The embodiment described above is merely one specific example in which the catch-up torque determiner 130 determines a catch-up torque in accordance with the rack position error information, and a relation equation or a method for determining a catch-up torque that is used by the catch-up torque determiner 130 is not limited or restricted to that of the embodiment described above. In addition, the relation equation or the method for determining a catch-up torque that is used by the catch-up torque determiner 130 may be realized also using the method described above or a relation equation, which is set in advance, including a gain value and may be realized using various relation equations used for performing the same function. For this, the catch-up torque determiner 130 may use the value of another variable of the catch-up torque table information.

As described with reference to FIGS. 1 to 5, in a steer-by-wire system, these embodiments provide effects of being capable of determining occurrence/no-occurrence of a catch-up in a rack driving motor based on the rack position error information, providing an accurate steering sense for a driver by reflecting torque information that has not been output due to a catch-up, and causing a steering angle and a rack position according thereto to coincide with each other by increasing a degree of steering difficulty at the time of an occurrence of the catch-up.

Hereinafter, a method of controlling a steer-by-wire system capable of performing all the embodiments described above will be described with reference to the drawings.

Figure 6:
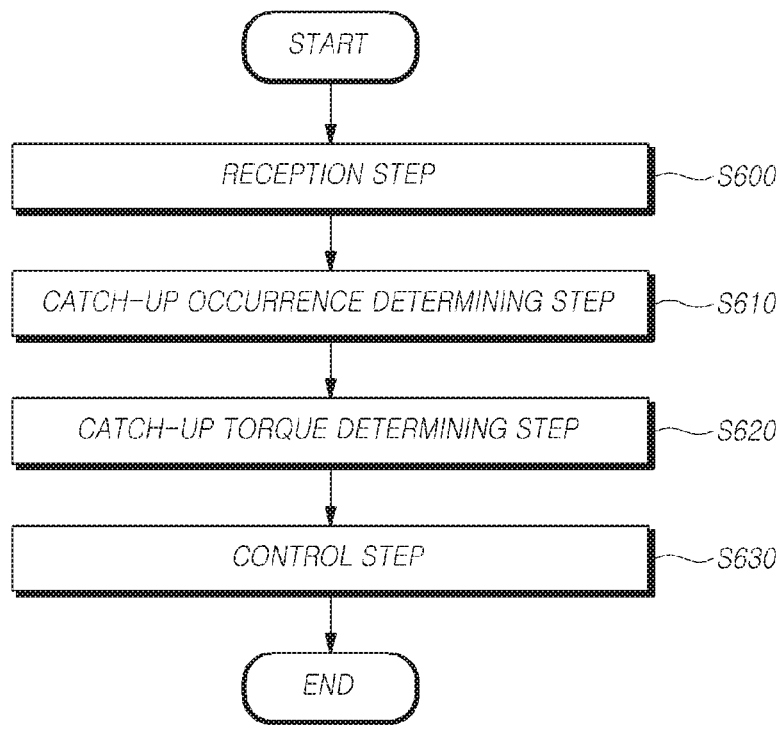
FIG. 6 is a diagram illustrating an operation of a method for controlling a steer-by-wire system according to one embodiment.

FIG. 6 is a diagram illustrating an operation of a method for controlling a steer-by-wire system according to one embodiment.

Referring to FIG. 6, the method for controlling a steer-by-wire system operating in the control apparatus for a steer-by-wire system may include a receiving step of receiving at least one of rack driving motor angular velocity information, rack position information, or rack axial force information from a sensor configured inside a vehicle, a catch-up occurrence determining step of determining occurrence/no-occurrence of a catch-up in which an output of the rack driving motor is less than a directed value due to a counter electromotive force based on at least one of rack driving motor angular velocity information, rack position information, or directed rack position information used for adjusting the vehicle wheels in accordance with driver steering, a catch-up torque determining step of determining a catch-up torque that has not been output due to a counter electromotive force in the rack driving motor based on the rack position information and the directed rack position information if an occurrence of a catch-up in the rack driving motor is determined, and a control step of controlling a steering reaction force motor based on the catch-up torque information.

In the receiving step of the control apparatus for a steer-by-wire system according to one embodiment, at least one of the rack driving motor angular velocity information, the rack position information, or the rack axial force information may be received from the sensor configured inside the vehicle (S600). In such a case, an angular velocity sensor of the rack driving motor may be an encoder mounted to the motor. The encoder can detect the number of revolutions, a rotation direction, and the like of the rack driving motor. In addition, a sensor used for receiving rack position information may be a sensor that is directly or indirectly attached to the rack. In addition, the rack axial force information may be information received from a sensor mounted inside or outside the vehicle. Alternatively, the rack axial force information may be information that is estimated by performing an additional process of determining the rack axial force information. For example, in order to estimate rack axial force information, in the receiving step information such as steering angle information, a torque of the rack driving motor, and a yaw rate may be received and transmitted, and then rack axial force information may be received from an additional system inside the vehicle estimating the rack axial force information. In addition, according to one embodiment, there may be a plurality of sensors, which are configured inside or outside the vehicle, generating information to be received in the receiving step. The sensor described above may be a spare sensor for preparing a sensor error or malfunction inside the vehicle. In addition, information received in the receiving step according to one embodiment is not limited to the angular velocity information of the rack driving motor, the rack position information, and the rack axial force information, steering angle information, drive steering torque information, and the like may be included if it is necessary for an operation of the method of controlling a steer-by-wire system.

In the catch-up occurrence generating step of the control apparatus for a steer-by-wire system according to one embodiment, occurrence/no-occurrence of a catch-up, in which an output of the rack driving motor is less than a directed value due to a counter electromotive force, nay be determined based on at least one of rack driving motor angular velocity information, rack position information, or a directed rack position information used for adjusting vehicle wheels in accordance with driver steering (S610). Here, the directed rack position information may include direction information used for moving the position of the rack based on information detected at a steering wheel of a steering column as information used for adjusting vehicle wheels in accordance with driver's steering. In other words, in the catch-up occurrence determining step, it may be determined whether or not a catch-up situation, in which an output corresponding to a directed torque is not acquired due to generation of a counter electromotive force if the rotation speed of the motor is high, has occurred in the rack driving motor.

For this, in the catch-up occurrence determining step, according to one embodiment, occurrence/no-occurrence of a catch-up may be determined by comparing rack position information with directed rack position information in a case in which the rack driving motor angular velocity information is equal to or higher than first angular velocity information. In other words, in the catch-up occurrence determining step, it may be determined that a counter electromotive force can be generated in the rack driving motor in a case in which the angular velocity is equal to or higher than a first angular velocity, and specific determination of a catch-up situation due to a counter electromotive force may be performed through a comparison between rack position information and directed rack position information.

At this time, the first angular velocity information according to one embodiment may be a threshold representing a condition under which a catch-up can occur. In addition, the first angular velocity information may be set in accordance with user in advance. Alternatively, the first angular velocity may be a value set in accordance with unique characteristics of the rack driving motor. Alternatively, the first angular velocity may be determined based on a motor characteristic curve representing a relation between the speed and the torque among unique characteristics of the rack driving motor. In such a case, the first angular velocity may be determined using rack axial force information that is estimated or received. For example, the first angular velocity may be determined in accordance with a motor characteristic curve, which is set in advance, of the rack driving motor and rack axial force information. In other words, there are unique characteristics for each motor, and accordingly, speed information to be output from the motor for outputting a rack axial force may be derived in accordance with motor characteristic curve information representing a relation between the speed (rpm) and the torque (Nm) and torque information of rack axial force information. In this process, first angular velocity information that can be maximally output by the motor may be derived.

In The catch-up occurrence determining step according to one embodiment, rack position error information acquired by determining a difference between rack position information and directed rack position information may be determined, and it may be determined that a catch-up has occurred in the rack driving motor in a case in which the rack position error information is equal to or larger than a second value set in advance. In other words, if a catch-up has occurred, there may be a difference between a directed rack position and an actual rack position, and, for this, it may be determined whether or not a catch-up has occurred in the rack driving motor by determining difference information between the actual rack position and the directed rack position. The reason for this is that the output of the rack driving motor decreases in a case in which a catch-up has occurred.

Meanwhile, if it is determined that a catch-up has occurred in the rack driving motor, in the catch-up torque determining step of the control apparatus for a steer-by-wire system according to one embodiment, a catch-up torque that has not been output due to a counter electromotive force in the rack driving motor may be determined based on the rack position information and the directed rack position information (S620). If a catch-up occurs, a situation in which a torque corresponding to the directed rack position information cannot be output to the rack driving motor occurs, and it is necessary to determine a torque that has not been output by the motor and reflect the determined torque on the steering reaction force motor. For this, in the catch-up torque determining step, a catch-up torque corresponding to a deficient output may be determined.

For this, in the catch-up torque determining step according to one embodiment, rack position error information acquired by determining a difference between the rack position information and the directed rack position information may be determined, and a catch-up torque may be determined based on the rack position error information, in other words, in a case in which an actual rack position is less than a directed rack position, it means that the output of the rack driving motor is insufficient as that much, and accordingly, the error information can be an index representing a motor torque that has not been output due to a catch-up. Accordingly, in the catch-up torque determining step according to one embodiment, a catch-up torque may be determined based on the rack position error information.

For example, in the catch-up torque determining step according to one embodiment, a catch-up torque corresponding to the rack position error information may be checked, and the catch-up torque may be determined based on catch-up torque table information that is mapped for each piece of rack position error information and is set in advance. In other words, in the catch-up torque determining step, a catch-up torque corresponding to the error information may be set in advance using the rack position error information as a variable. Alternatively, in the catch-up torque determining step, a catch-up torque may be determined using a relation equation, which has the rack position error information as its variable, set in advance. Alternatively, in the catch-up torque determining step, a catch-up torque may be determined using the rack position error information and information such as a rack axial force and an external load representing a vehicle state.

In the control step of the control apparatus for a steer-by-wire system according to one embodiment, the steering reaction force motor may be controlled based on the catch-up torque information determined in the catch-up torque determining step (S630). This may mean that an output of the rack driving motor corresponding to the catch-up torque is not acquired, and, as a result, the rotation of the vehicle wheels corresponding to driver's steering is not performed, and accordingly, in the control step according to one embodiment, rotation information of the vehicle wheels may be reflected on the driver.

In such a case, in the control step according to one embodiment, the control apparatus for a steer-by-wire system may convert the catch-up torque information into an additional current to be applied to the steering reaction force motor and supply the additional current to the steering reaction force motor. Since a torque of the rack driving motor that has not been output is determined using a unit of the amount of torque in the catch-up torque determining step according to one embodiment, it is necessary to convert the catch-up torque into an amount of current based on unique characteristics of the steering reaction force motor that can provide a reaction sense for a driver and unique characteristics of the vehicle and supply the resultant current in the control step. At this time, in the control step, the control apparatus for a steer-by-wire system may convert the catch-up torque into a current using a conversion value that is a predetermined constant and reflect the catch-up torque information on the steering reaction force motor. In such a case, the predetermined constant may be a value that is set in advance using unique information of the vehicle. Alternatively, the predetermined constant may be a value set by a user in advance. Alternatively, in the control step, the control apparatus for a steer-by-wire system may convert the catch-up torque into a current using a conversion value that can be changed in accordance with a vehicle state and reflect the catch-up torque information on the steering reaction force motor. In such a case, the conversion value that can be change may be determined in accordance with a vehicle state and running information. For example, motor torque information representing a driving status of the steering reaction force motor or the amount of current applied to the steering reaction force motor in accordance with motor RPM information may be changed. Alternatively, the amount of current applied to the steering reaction force motor may be changed also in accordance with driver's steering angle information. In addition, in such a case, in the control step, a control operation of the control apparatus for a steer-by-wire system may be performed in parallel with an existing control logic used for controlling the steering reaction force motor.

At this time, the embodiment described above is merely one embodiment for the control apparatus for a steer-by-wire system in the control step to reflect catch-up torque information on the steering reaction force motor, and the method of reflecting catch-up torque information on the steering reaction force motor in the control step is not limited or restricted to that of the embodiment described above. In addition, in order to reflect the catch-up torque information on the steering reaction force motor, the control apparatus for a steer-by-wire system in the control step may perform various motor control methods functioning the same as the method described above.

Through this, the control apparatus for a steer-by-wire system in the control step can accurately provide catch-up torque information that is not output due to a catch-up in the rack driving motor for the driver by substantially supplying a current to the steering reaction force motor.

As above, for the objective described above, the receiving step, the catch-up occurrence determining step, the catch-up torque determining step, and the control step of the method for controlling a steer-by-wire system may be realized using one or more processors operated in accordance with a set program, and the set program may include a series of instructions used for operating each component included in the control apparatus of a steer-by-wire system according to one embodiment of the present technological idea described above.

Figure 7:
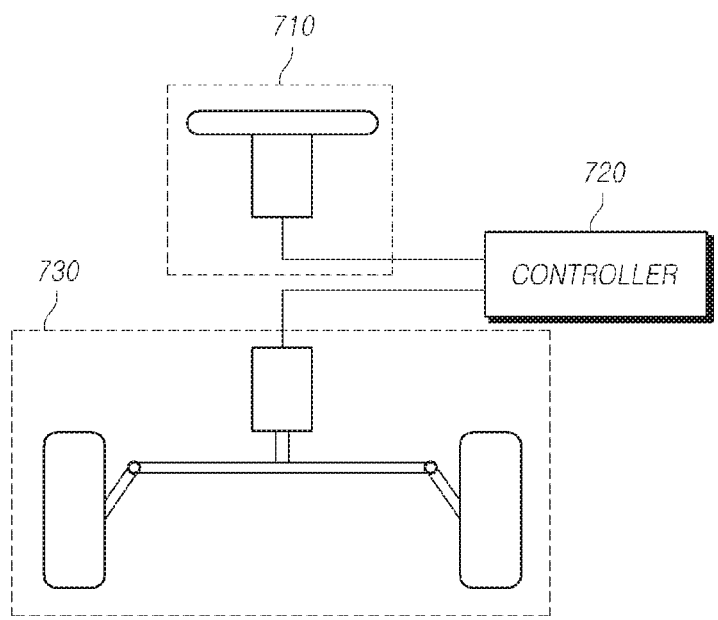
FIG. 7 is a diagram illustrating the configuration of a steer-by-wire system of a vehicle according to one embodiment of the present disclosure.

FIG. 7 is a diagram illustrating the configuration of a steer-by-wire system of a vehicle according to one embodiment of the present disclosure.

The steer-by-wire (SBW) system represents an apparatus that detects a driver's operation of a steering wheel and generates a signal or receives a signal from an automated running apparatus or system and controls steering of a road wheel using the signal instead of a mechanical structure connecting a steering wheel and the road wheel.

In a general electric power steering apparatus, a steering wheel, a column, an intermediate shaft (IMS) for the steering apparatus, a rack, and a road wheel are mechanically connected, and a neutral position of the road wheel or the rack and a neutral position of the steering wheel are constantly fixed. In other words, the road wheel or the rack and the steering wheel are physically connected and thus are constantly synchronized with each other.

On the other hand, in the case of an SBW system, an input side (a steering column) including a steering wheel and a column and an output side (steering rack) including a road wheel and a rack are not physically connected and are controlled based on a signal generated by an electronic control apparatus.

Referring to FIG. 7, a vehicle according to the present disclosure includes: a steering column 710 that receives a steering control signal for the vehicle from a driver of the vehicle or an automated running apparatus or a system; a controller 720 that generates a steering control signal for a steering rack 730 using information input from the steering column 710; and a steering rack 730 that controls road wheels of the vehicle in accordance with a steering control signal.

More specifically, the steering column 710 may include a steering wheel, a steering shaft, a steering angle sensor that detects a steering angle of the steering wheel, a torque sensor that detects a torque of a steering shaft of the steering wheel, a steering reaction force motor that provides a steering torque for the steering wheel, and the like. The steering rack 730 may include a road wheel, a driving shaft, a steering output sensor that can detect a rotation angle of the road wheel, a rack driving motor that generates an auxiliary force and causes the road wheel to rotate, a rack driving motor position sensor and a rack driving motor angular velocity sensor that respectively detect a position and an angular velocity of a rotation shaft of the rack driving motor, a rack position sensor that detects a position of the rack, and the like. The controller 720 may be an electronic control unit (ECU) or a domain control unit (DCU) that not only performs steering control but also controls a series of driver assisting systems or an automated running apparatus or system.

The steering rack 710 illustrated in FIG. 7 detects rack driving motor angular velocity information and rack position information of the vehicle. Here, an angular velocity sensor of the rack driving motor detecting a rack driving motor angular velocity information of the vehicle may be an encoder mounted to the motor. The encoder may detect the number of revolutions, a rotation direction, and the like of the rack driving motor. A sensor used for receiving rack position information may be a sensor that is directly or indirectly attached to the rack. In addition, the rack axial force information may be information detected using a sensor mounted inside or outside the vehicle. Alternatively, the rack axial force information may be information that is estimated by performing an additional process of determining the rack axial force information. In order to estimate the rack axial force information, for example, after receiving steering angle information and information such as a rack driving motor torque, a yaw rate, and the like, the steering rack may estimate rack axial force information by processing the received information. In addition, information detected by the steering rack 710 according to one embodiment is not limited to the rack driving motor angular velocity information, the rack position information, and the rack axial force information but may include information received from other sensors and the like if it is necessary for the operation of the steer-by-wire system.

The controller 720 illustrated in FIG. 7 determines occurrence/no-occurrence of a catch-up in which the output of the rack driving motor is less than a directed value due to a counter electromotive force based on at least one of the rack driving motor angular velocity information or the rack position information detected by the steering rack 710 and directed rack position information used for adjusting vehicle wheels according to driver's steering. In other words, the controller may determine whether or not a catch-up situation, in which the output corresponding to a directed torque is not acquired due to generation of a counter electromotive force if the rotation speed of the motor is high, has occurred in the rack driving motor.

If it is determined that a catch-up has occurred in the rack driving motor, the controller 720 may determine a catch-up torque that has not been output due to a counter electromotive force in the rack driving motor based on the rack position information and the directed rack position information, and the steering column 730 may drive the steering reaction force motor based on catch-up torque information determined by the controller 720. Since this may mean that the output of the rack driving motor corresponding to the catch-up torque is not acquired, and, as a result, the rotation of vehicle wheels corresponding to driver's steering is not performed, the steer-by-wire system according to one embodiment me reflect rotation information of such vehicle wheels on the driver.

Regarding the steering rack, the controller, and the steering column according to the present disclosure, the description of the apparatus and the method for controlling a steer-by-wire system may be referred to.

Generally, terms such as "system". "processor", "controller", "component", "module", "interface", "model" and "unit" may mean computer-related entity hardware, combinations of hardware and software, software, or executing software. For example, the constituent elements described above may be a process driven by a processor, a process, a processor, a controller, a control processor, an entity, an execution thread, a program and/or a computer but are not limited thereto. For example, both an application executed by a controller or a processor and a controller or a processor may be a constituent element. One or more constituent elements may be present within a process and/or an execution thread, and constituent elements may be disposed in one system or may be distributed in two or more systems.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A control apparatus comprising:
   a receiver that receives rack driving motor angular velocity information and rack position information from a sensor configured inside a vehicle;
   a catch-up occurrence determiner that determines whether a catch-up in which an output of a rack driving motor is less than a directed value due to a counter electromotive force occurs based on at least one of the rack driving motor angular velocity information, the rack position information, or directed rack position information used for adjusting vehicle wheels in accordance with driver steering;
   a catch-up torque determiner that determines a catch-up torque that has not been output due to the counter electromotive force in the rack driving motor based on the rack position information and the directed rack position information if it is determined that the catch-up has occurred in the rack driving motor; and
   a controller that controls a steering reaction force motor based on the catch-up torque information,
   wherein upon determining that the rack driving motor angular velocity information is equal to or higher than first angular velocity information, the catch-up occurrence determiner determines whether the catch-up occurs by comparing the rack position information with the directed rack position information.

2. The control apparatus according to claim 1,
   wherein the controller converts the catch-up torque information into an additional current to be applied to the steering reaction force motor and supplies the additional current to the steering reaction force motor.

3. The control apparatus according to claim 1,
   wherein the first angular velocity information is a value determined according to unique characteristics of the rack driving motor.

4. The control apparatus according to claim 1,
   wherein the receiver receives rack axial force information from the sensor mounted inside the vehicle, and
   wherein the first angular velocity information is determined in accordance with at least one of a motor characteristic curve, which is set in advance, of the rack driving motor or the rack axial force information.

5. The control apparatus according to claim 1,
   wherein the catch-up occurrence determiner determines rack position error information acquired by determining a difference between the rack position information and the directed rack position information and determines that the catch-up has occurred in the rack driving motor in a case in which the rack position error information is equal to or larger than a second value set in advance.

6. The control apparatus according to claim 1,
   wherein the catch-up torque determiner determines rack position error information acquired by determining a difference between the rack position information and the directed rack position information and determines the catch-up torque based on the rack position error information.

7. The control apparatus according to claim 6,
   wherein the catch-up torque determiner checks the catch-up torque corresponding to the rack position error information and determines the catch-up torque based on catch-up torque table information that is mapped for each piece of the rack position error information and is set in advance.

8. A steer-by-wire system comprising:
   a steering rack that detects rack driving motor angular velocity information and rack position information of a vehicle;
   a controller that
      determines whether a catch-up in which an output of a rack driving motor is less than a directed value due to a counter electromotive force occurs based on at least one of the rack driving motor angular velocity information or the rack position information detected by the steering rack or directed rack position information used for adjusting vehicle wheels in accordance with driver steering and determines a catch-up torque that has not been output due to a counter electromotive force in the rack driving motor based on the rack position information and the directed rack position information if it is determined that the catch-up has occurred in the rack driving motor; and a steering column that drives a steering reaction force motor based on the catch-up torque information determined by the controller, wherein upon determining that the rack driving motor angular velocity information is equal to or higher than first angular velocity information, the controller determines whether the catch-up occurs by comparing the rack position information with the directed rack position information.

9. A control method comprising:

receiving rack driving motor angular velocity information and rack position information from a sensor configured inside a vehicle;

determining whether a catch-up in which an output of a rack driving motor is less than a directed value due to a counter electromotive force occurs based on at least one of the rack driving motor angular velocity information, the rack position information, or directed rack position information used for adjusting vehicle wheels in accordance with driver steering;

determining a catch-up torque that has not been output due to the counter electromotive force in the rack driving motor based on the rack position information and the directed rack position information if it is determined that the catch-up has occurred in the rack driving motor; and controlling a steering reaction force motor based on the catch-up torque information, wherein in the determining whether the catch-up occurs, upon determining that the rack driving motor angular velocity information is equal to or higher than first angular velocity information, whether the catch-up occurs is determined by comparing the rack position information with the directed rack position information.

10. The control method according to claim 9, wherein, in the determining whether the catch-up occurs, rack position error information acquired by determining a difference between the rack position information and the directed rack position information is determined, and it is determined that the catch-up has occurred in the rack driving motor in a case in which the rack position error information is equal to or larger than a second value set in advance.

11. The control method according to claim 9, wherein, in the receiving of rack driving motor angular velocity information, rack axial force information is additionally received from the sensor mounted inside the vehicle, and wherein the first angular velocity information is determined in accordance with at least one of a motor characteristic curve, which is set in advance, of the rack driving motor or the rack axial force information.

12. The control method according to claim 9, wherein, in the determining of the catch-up torque, rack position error information acquired by determining a difference between the rack position information and the directed rack position information is determined, and the catch-up torque is determined based on the rack position error information.

13. The control method according to claim 12, wherein, in the determining of the catch-up torque, based on catch-up torque table information that is mapped for each piece of the rack position error information and is set in advance, the catch-up torque corresponding to the rack position error information is checked, and the catch-up torque is determined.

* * * * *